United States Patent

[11] 3,625,880

[72] Inventors Glen P. Hamner
Baton Rouge;
Ralph B. Mason, Denham Springs, both of La.
[21] Appl. No. 866,742
[22] Filed Oct. 15, 1969
[45] Patented Dec. 7, 1971
[73] Assignee Esso Research and Engineering Company
Continuation-in-part of application Ser. No. 667,660, Sept. 14, 1967, now Patent No. 3,575,846, and a continuation-in-part of 637,911, May 12, 1967, now Patent No. 3,497,448. This application Oct. 15, 1969, Ser. No. 866,742

[54] CATALYSTS FOR THE SELECTIVE CONVERSION OF STRAIGHT-CHAIN HYDROCARBONS
16 Claims, No Drawings

[52] U.S. Cl. .................................................. 208/111,
208/60, 208/62, 208/89, 208/139, 208/213,
208/216, 252/439, 252/441, 252/455 Z, 260/667,
260/672 R
[51] Int. Cl. ........................................................ C10g 37/06,
C07c 3/58, B01j 11/40
[50] Field of Search ........................................... 208/60,
111, 139, 213; 260/672, 667

[56] References Cited
UNITED STATES PATENTS

| | | | |
|---|---|---|---|
| 3,039,953 | 6/1962 | Eng ........................... | 208/26 |
| 3,331,768 | 7/1967 | Mason et al. ................. | 208/111 |
| 2,950,952 | 8/1960 | Breck et al. .................. | 23/113 |
| 3,140,322 | 7/1964 | Frilette et al. ................ | 208/120 X |
| 3,344,058 | 7/1967 | Miale .......................... | 208/111 |
| 3,509,042 | 4/1970 | Miale .......................... | 208/120 |
| 3,294,858 | 12/1966 | Butler et al. ................. | 208/26 |
| 3,114,696 | 12/1963 | Weisz .......................... | 208/66 |
| 3,331,767 | 7/1967 | Arey et al. ................... | 208/111 |
| 3,395,096 | 7/1968 | Gladrow et al. ............... | 208/111 |
| 3,314,895 | 4/1967 | Munns .......................... | 252/455 |

Primary Examiner—Delbert E. Gantz
Assistant Examiner—G. E. Schmitkons
Attorneys—Pearlman and Stahl and N. Elton Dry ABSTRACT: Improved catalysts for the selective conversion of straight-chain hydrocarbons contained in a hydrocarbon feed comprise a synthetic, relatively small pore size crystalline alumino-silicate zeolite. Preferably, the synthetic small pore size zeolite is combined with a metallic hydrogenation component and used in the selective conversion of low octane-producing normal paraffins to upgrade the hydrocarbon feed stock. The process is preferably conducted in the presence of added hydrogen at elevated temperatures and pressures.

CATALYSTS FOR THE SELECTIVE CONVERSION OF STRAIGHT-CHAIN HYDROCARBONS

CROSS-REFERENCES TO RELATED APPLICATIONS

This case is a continuation-in-part of U.S. Ser. No. 667,660, filed Sept. 14, 1967 (now U.S. Pat. No. 3,575,846) and U.S. Ser. No. 637,911, filed May 12, 1967, now U.S. Pat. No. 3,497,448.

BACKGROUND OF THE INVENTION

1. Field of the Invention

This invention relates to the removal of straight-chain hydrocarbons from hydrocarbon feedstocks containing same in combination with nonstraight-chain hydrocarbons. More particularly, it relates to the use of an improved catalyst for this purpose, which catalyst comprises a relatively small pore size crystalline alumino-silicate zeolite which has been synthetically prepared. Still more particularly, it relates to a selective hydrocracking process accomplished in the presence of a synthetic, small pore size crystalline zeolite having a low alkali metal content, and combined with a metallic hydrogenation component, said process being conducted with the imposition of a substantial hydrogen pressure. In its most preferred aspects, the invention relates to the octane improvement of naphtha feeds using the above-described process, particularly in connection with conventional reforming operations wherein the aforedescribed catalyst can be used either before, during or after the reforming operation so as to remove the low octane-producing straight-chain components of the petroleum-derived feed and/or product.

2. Description of the Prior Art

Hydrocarbon conversion and upgrading with crystalline alumino-silicate zeolite catalysts are now well known in the art. The use of these materials for such purposes as hydrocracking has been generally directed to typical petroleum-derived feedstocks such as gas oils, etc., which are customarily converted to lower boiling products useful as gasoline. The crystalline zeolites employed for such purposes usually have uniform pore openings of about 6 to 15 angstroms and are therefore nonselective; that is, substantially all of the feed molecules are admitted into the zeolite pore structure and converted. For many purposes selective hydrocracking of particular molecular species in the feed to the substantial exclusion of others is desired. For example, octane improvement of naphtha fractions can be accomplished by selectively hydrocracking only the straight-chain hydrocarbons (e.g., olefins, paraffins, etc.) which tend to be low octane-producing, thereafter removing the hydrocracked products, and finally recovering a higher octane product. Selective hydrocracking of straight-chain hydrocarbons contained in lube oil or gas oil fractions is also valuable for the purpose of pour point reduction or dewaxing.

The use of a nonselective large pore (e.g. 6 to 15 angstroms) crystalline zeolite for such purpose is largely ineffectual, as the desired feed molecules (e.g. aromatics) are admitted into the zeolite pores and converted together with the straight-chain hydrocarbons. It has now been found that certain specific small pore size zeolites provide a valuable and unique catalyst component for the selective hydrocracking of straight-chain hydrocarbons. The zeolites specifically are those small pore size crystalline zeolites which have been synthetically produced, and which further have a low alkali metal content.

By "relatively small pore size" is meant a pore size of below about 6 angstrom units, particularly 4 to 6 angstroms e.g. about 5 angstroms. More particularly, the catalyst employed will have pores capable of affording entry to the objectionable normal paraffinic hydrocarbons but incapable of admitting the more valuable branched and cyclic hydrocarbons. For convenience, these materials may hereinafter be referred to generally as "5-angstrom zeolites." The result of such treatment is to selectively convert the normal paraffinic components either to lower boiling saturated products which can then be readily removed, thereby leaving a naphtha product of highly improved quality, or to desirable branched-chain paraffins and/or olefins which tend to be high-octane-producing components.

The synthetic preparation of crystalline metalloalumino-silicate zeolites having uniform pore openings of less than about 6 angstroms contemplated for use in this invention is well known. Basically, it involves crystallization from reaction mixtures containing suitable sources of alkali metal oxide, silica, alumina and water. The proportion of the various ingredients will determine the type of synthetic zeolite obtained, as well as its crystallinity and the yield of final product. However, it will be appreciated that for any particular type of crystalline zeolite a wide range of reactant ratios can be employed with varying degrees of success.

The sources of the various ingredients mentioned above may vary, but a representative list for each would include; (1) as a source of silica: sodium meta silicate, sodium polymeric silicate, silica gel, silica sol., with silica sol. being particularly preferred; (2) as a source of alumina: sodium aluminate, alumina sol., alumina-trihydrate, aluminum salts of organic and inorganic acids such as aluminum acetate, aluminum chloride, aluminum sulfate and the like, with sodium aluminate being particularly preferred; and (3) as a source of alkali metal oxide: sodium hydroxide, potassium hydroxide, cesium hydroxide, sodium oxide, potassium oxide, cesium oxide, potassium aluminate, potassium silicate with the hydroxides of sodium and potassium being particularly preferred. In the synthesis of certain zeolites, such as erionite, a combination of such sources of alkali metal oxides, such as a combination of sources of sodium and potassium, is required.

In order to achieve a particularly desired result, a judicious selection of reactant ratios, crystallization times, reactant source materials and process conditions are required. Generally, for the production of the small pore size zeolite erionite, the reactants are thoroughly mixed at ambient temperatures, heated to a temperature of from about 80° to 150° C., preferably 120° to 150° C., and held at such a temperature for a sufficient period of time to form the crystalline zeolite product, preferably from 1 to 10 days, and most preferably from 2 to 6 days. The pressure utilized will usually be about atmospheric pressure in the case of operation at or below 100° C., and will be correspondingly increased to the vapor pressure of the reaction mixture at a temperature higher than 100° C., in order to prevent substantial loss of water from the reaction mixture. Typical optimum crystallization times for temperatures from 80° to 110° C. will be about 50 to about 300 hours, preferably from 100 to 200 hours. Higher temperatures will allow shorter crystallization times.

For temperatures in the vicinity of 147° C., for example, suitable crystallization periods will usually range from about 1 to 3 days, preferably 1.5 to 2 days. After the formation of the crystalline zeolite phase, the zeolite crystals are filtered from the mother liquor and preferably washed throughout until the water wash has a pH of about 8 to 11. Afterwards, the zeolite crystals are preferably dried in air at a temperature, for example, of about 100° to 200° C. The crystals may be finally activated for use as an absorbent or as a catalyst support by heating at a temperature of about 250° to 350° C. to thereby drive off water of hydration, leaving a crystalline structure interlaced with canals of molecular dimensions.

Specifically, the relatively small pore size synthetic zeolites of the present invention include the synthetic counterparts of the naturally occurring zeolites erionite, chabazite and analcite. The most preferred zeolite being erionite. The preparation of the small pore size synthetic zeolites erionite is, basically, as follows:

| | Reactant mole ratios | | |
|---|---|---|---|
| | Broad | Preferred | Particularly preferred |
| $SiO_2/Al_2O_3$ | 5–50 | 8–30 | 10–20 |
| $K_2O+Na_2O/SiO_2$ | 0.2–0.5 | 0.25–0.45 | 0.3–0.4 |
| $H_2O/SiO_2$ | 4–20 | 5–15 | 7–10 |
| $Na_2O/Na_2O+K_2O$ | 0.5–0.85 | 0.6–0.7 | 0.65–0.75 |

Erionite per se is a naturally occuring zeolite having elliptical pore openings of about 4.7 to 5.2 angstroms on its major axis. The synthetic counterpart has been designated in the art as "Zeolite T" in U.S. Pat. No. 2,950,952, and is characterized by a stoichiometric composition, in terms of mole ratios of oxides, as follows:

$$1.1\pm0.4\,[x\,Na_2O:(1-x)K_2O]Al_2O_3:6.9\pm0.5\,SiO_2:yH_2O$$

wherein $X$ is any value from about 0.1 to about 0.8, and $y$ is any value from about 0 to about 8. The latter patent further disclosed typical X-ray diffraction patterns possessed by Zeolite T.

SUMMARY OF THE INVENTION

It is a primary object of the present invention to provide a catalyst of improved activity for use in the selective conversion of straight-chain hydrocarbons contained in admixture with nonstraight-chain hydrocarbons.

In accordance with the present invention it has now been discovered that certain small pore size crystalline alumino-silicate zeolites exhibit superior activity when used as catalysts to selectively convert straight-chain hydrocarbons from a mixture of hydrocarbons of various configuration. In particular, it has been found that synthetically prepared crystalline alumino-silicates, having a uniform pore size of less than about 5 angstroms, particularly those which represent the synthetic counterparts of certain naturally occurring small pore size crystalline zeolites, exhibit such superior catalytic activity, particularly when compared with their naturally occurring counterparts. These catalysts of the present invention will find their highest utility in the process of selectively hydrocracking straight chain components in a hydrocarbon feed stock, particularly a naphtha feed stock, either prior to or subsequent to conventional reforming operations.

DETAILED DESCRIPTION

The starting materials for the preparation of the catalysts of the present invention are the synthetically produced relatively small pore size crystalline alumino-silicate zeolites described above.

These small pore size synthetic zeolites are treated to remove essentially all of the sodium alkali metal content and a substantial amount of the potassium alkali metal content. Prior to alkali metal removal, these small pore size zeolites generally have an alkali metals content in the range of about 8.5 to 10 weight percent. Conventional means for reducing the alkali metal content, such as by ion exchange with a replacing cation, will ordinarily be sufficient to reduce the potassium content by about 40 percent, e.g. down to a level of about 5.0 to 6.5 weight percent. In order to further reduce this level, various means are provided. This additional alkali metal removal has the surprising effect of increasing its activity (i.e. operation at a lower temperature produces equivalent results) and the selective conversion ability of the zeolite material, so as to remarkably enhance its utility as a catalyst for the selective conversion of straight-chain hydrocarbons. Two of the most convenient means involve either the use of high temperatures in the ion exchange with a suitable solution containing a replacement cation, or multiple exchanges with two or more different types of replacement cations which has the effect of reducing the potassium ion content to a greater degree than possible through the use of only one replacement cation. By these procedures, final alkali metal levels below 3.5 weight percent, and preferably below 1.5 weight percent may be obtained.

It has been found that conventional ion exchange with certain cation solutions at high temperatures will accomplish the desired degree of alkali metal reduction. In this connection it will be necessary to conduct the ion exchange at temperatures in the range of about 150° to 300° F., preferably 180° to 225° F., and it will be further necessary to conduct multiple exchanges with the cationic solution. Generally, at least two exchanges and preferably three exchanges will be required to achieve the desired degree of reduction. In addition to the temperature at which the exchanges are conducted, it has been found that the type of cation and anion present in the exchange solution will have an effect on the degree of reduction attainable. Suitable cations will include hydrogen, ammonium, sodium, magnesium, zinc, and calcium cations. Suitable anions will include nitrate, sulfate, chloride and acetate anions. Of these, combinations of (1) hydrogen cation with either the nitrate, chloride or sulfate anions (acid solutions); and (2) ammonium cation with one of the aforementioned anions, are considered most effective in reducing the potassium content. With these acidic solutions, concentrations should be maintained at low levels to prevent deterioration of the crystal structure. Thus, for example, with solutions of hydrochloric and nitric the solution is maintained at less than 1 normal. While some replacement of the alkali metal with the metallic cations does occur, it is to a lesser degree than with the hydrogen or ammonium cations.

A second means for reducing the alkali metal content to the desired ranges involves the use of multiple cation exchange at ambient temperature using hydrogen-containing cation solutions and metal cation-containing solutions. By initial exchange of the zeolite with hydrogen-containing cations followed by exchange with metal cations, the low alkali metal levels can be achieved. In this multiple ion exchange treatment the zeolite will preferably be first treated under highly acidic conditions, e.g. a pH of 1–5 with an acid or a solution of a salt of a weak base and a strong acid. Ammonium salts of hydrochloric, nitric, and sulfuric acid are particularly suited for this purpose. The initial hydrogen and/or ammonium ion exchange will usually be sufficient to reduce the potassium content by about 50 to 70 percent, i.e. down to potassium levels of about 2 to 3.5 weight percent of the erionite. Following this initial ammonium or hydrogen ion treatment, further reduction in potassium content is accomplished by exchange with a metallic cation. Typical metallic cations will include cations of metals in Groups IA, IB, IIA, IIB, VIIB and VIII, particularly IB, IIB, and VIII and most particularly metals in Group IIB of the Periodic Table, e.g., zinc and cadmium. This second ion exchange treatment will usually be sufficient to further reduce the alkali metal content by about 50 to 90 percent, i.e. down to levels of about 0.5 to 3.0 weight percent of the zeolite.

A final minor reduction in alkali metal content is achieved by incorporation of a hydrogenation component. This last step reduction in potassium is comparatively small. In the case of those catalysts prepared by use of ammonia complexes and ammoniacal solutions of metals such as platinum group metals, this final increment removal may be considered as an additional ammonium ion exchange; although at the dilutions usually employed it is essentially an additional wash step serving to remove the potassium ions displaced by the metal ion exchange.

The exchanges involve contact of the zeolite, with stirring, with aqueous solutions containing the exchanging ion in concentrations ranging from about 5 to 30 weight percent concentration, preferably 10 to 25 weight percent concentration for periods ranging from 1 to 30 hours, preferably 2 to 6 hours. The preferred exchange technique involves suspension of the zeolite in water and addition of a concentrated solution thereto with good agitation so that the resultant concentration of the exchange ion falls within preferred ranges. Following the exchange and removal of the contacting solution by filtration the cake is water washed by suspension, with good agitation in typical proportions of about one to 10 parts by weight of water from typical periods of 0.5 to 2, e.g., about 1 hour. In the case of ammonium and zinc ion exchanges (moderately acidic solutions) is is desired that all contact with treating solution and washes be at ambient temperature to avoid losses of crystallization. The catalysts discussed subsequently and prepared by multiple ion exchanges were water washed one time after each exchange and three times after the last exchange.

As a further step in the preparation of the catalysts of the invention, the catalyst is preferably combined with an active metallic hydrogenation component which may be chosen from Groups VB, VIB, VIIB or VIII of the Periodic Table and which is suitably exemplified by the metals cobalt, platinum, chromium, palladium, molybdenum, tungsten, etc. The hydrogenation component may be in the form of the free metal as in the case of platinum group metals, or as the oxide or sulfide as in the case of cobalt, etc., or mixtures of such metals, oxides or sulfides. Platinum group metals (i.e. metals of the platinum and palladium series) will be preferred for purposes of the present invention, with palladium being particularly preferred. In addition, the nonnoble metals of Group VIII are also particularly preferred for use as active hydrogenation components. These include nickel, cobalt, iron, with nickel particularly preferred, and additionally to which the oxy and/or the anion of Group VI metals, including molybdenum and tungsten may be adducted. Incorporation of the hydrogenation component may be accomplished by any conventional technique such as ion exchange followed by reduction, impregnation, etc. When palladium is employed, the zeolite is preferably impregnated with an ammoniacal solution of palladium chloride sufficient to produce the desired amount of hydrogenation metal in the final product, and then dried and calcined at a temperature of 800° to 1000° F. Reduction of the metal is then accomplished either separately or in the hydrocracking reaction per se. The amount of hydrogenation component may range from about 0.1 to about 25 weight percent, preferably about 2 to about 10 weight percent, based on the weight of final product. In the case of platinum group metals, e.g. palladium, the preferred amount will be in the range of about 0.1 to 6 e.g., 0.5 to 3 weight percent based on dry catalyst. In the case of the nonnoble metals of Group VIII, where a Group VI anion is adducted thereto, the preferred combination will be nickel-tungsten, wherein the nickel is present in the range of from 2 to 5 weight percent, and the tungsten, as the oxide, is present in the range of from 4 to 10 weight percent.

It has been further found that the activity and effectiveness of certain catalysts used herein may be substantially improved by contact with sulfur prior to or during their use in the selective hydrocracking process. Specifically, those catalysts of the invention wherein the synthetic zeolite has been exchanged with Group II-B metal cations, are particularly susceptible to improvement via sulfactivation. The catalyst is preferably sulfactivated in these instances to enhance its activity by contact either with a sulfur-containing feed, or if the feed has a low sulfur content, with hydrogen sulfide or an added sulfur compound which is readily convertible to hydrogen sulfide at the hydro conditions employed, e.g., carbon disulfide, etc. The extent of this sulfactivation treatment should be sufficient to incorporate 0.5 to 15 weight percent sulfur into the catalyst.

The feed stocks utilized in the present invention will generally include mixtures of hydrocarbons and particularly petroleum distillates falling within the approximate range of about 80° to about 850° F., which range will include naphthas, gasolines, kerosenes, gas oils, middle distillates, etc. Preferably, the feed will be predominantly naphtha-containing and may consist of either low boiling or high boiling naphthas. Typical low boiling feeds will have boiling ranges of about 50° to 350° F., preferably 75° to 300° F., whereas typical heavy naphtha feeds will boil within the range of about 250° to 450° F., preferably 300° to 430° F. Examples of such feed stocks both low boiling and high boiling, are virgin naphtha fractions such as $C_5$–$C_6$ naphtha, heavy virgin naphtha, heavy coker naphtha, heavy steam cracked naphtha, heavy catalytic naphtha, etc. Particularly preferred feed stocks will include the light naphthas as described above, naphthas suitable as hydroformer feeds and naphtha products from the hydroforming operation, which feeds will typically boil in the range of about 50° to 400° F., preferably 80° to 350° F. A prime hydroformer feed will have about a 180° to 360° F. boiling range. A requirement for the feed stocks used in the present invention is that they contain a substantial quantity of straight chain hydrocarbons which are converted or removed in accordance with the present invention.

The above feed stocks are treated with the aforedescribed small pore size synthetic zeolite catalysts in either fixed bed, moving bed, or fluidized solids operation, either upflow or downflow (in bed reactors), at the following operating conditions:

|  | Generally preferred | Particularly preferred |
|---|---|---|
| Temperature, ° F | 650–1,000 | 700–900 |
| Pressure, p.s.i.g | 100–2,000 | 200–1,000 |
| Space velocity, v./v./hr | [1] 0.25–5 | [1] 0.5–2 |
|  | [2] 0.5–10 | [2] 1–5 |
|  | [3] 0.5–40 | [3] 4–20 |
| Hydrogen Rate, s.c.f./b | 500–10,000 | 1,000–4,000 |

[1] Kerosene-gas oil of 300–850° F. boiling range.
[2] Naphthas of 50–200° F. boiling range.
[3] Naphthas in 180–430° F. boiling range usable in hydroforming operations.

The essence of the present invention, namely the use of the aforedescribed catalysts for the selective removal of straight-chain hydrocarbons, can be utilized in various processing schemes depending upon the results desired. These various processing schemes will not be described in some detail as they represent specific embodiments of the present invention.

The catalysts of the invention can conveniently be used to upgrade naphtha fractions for inclusion in the high-quality motor gasoline pools. This may involve a single-stage operation wherein the naphtha feed is introduced into contact with the synthetic small pore size catalysts at the aforedescribed conditions and the resulting product has a greatly enhanced octane number.

The zeolite catalysts of the invention can be utilized to upgrade previously hydrocracked feed stocks, e.g. an additional hydrocracking stage containing small pore size synthetic zeolite catalysts can be used in conjunction with a conventional hydrocracking operation in order to produce a higher octane product. The conventional hydrocracking stages are conducted with any of the various available hydrocracking catalysts and most preferably with the newly developed relatively large pore size (e.g. 6 to 15 angstrom units) crystalline alumino-silicate zeolite catalysts containing metallic hydrogenation components. Such catalysts have been extensively described in the prior art, e.g. U.S. Pat. Nos. 2,971,904 and 3,287,252. In this embodiment the total hydrocracked product from the relatively large pore size zeolite catalysts, or a selected portion thereof, may be contacted with the selective small pore size, synthetic catalysts of the invention. Intermediate fractionation and segregation of desired fractions can be used. Typical hydrocracking conditions with the large pore zeolite catalysts will include temperatures from about 400° to 800° F., pressures of about 250 to 2,500 p.s.i.g. liquid hourly spaced velocities of about 0.2 to 5 V/V hr. and hydrogen ranges of about 1,000 to 20,000 s.s.f./bbl.

The synthetic zeolite catalysts of the present invention can be used in conjunction with conventional hydroforming operations. In this case the zeolite catalysts can be used in a lead reactor to pretreat the feed passing to the hydroforming reactors, or can be utilized either in a separate tail reactor or in a bottom portion of the last reactor of the series employed in a hydroformer, to selectively convert the remaining straight-chain hydrocarbons so as to further increase the octane number hydroformed product. The catalysts can also be utilized in admixture with conventional hydroforming catalysts in one or more conventional hydroforming reactors.

"Hydroforming" operations are well known in the art and involve treatment of hydrocarbon fractions boiling in the motor fuel or naphtha range at elevated temperatures and pressures in the presence of certain solid catalysts and hydrogen. Hydroforming usually consists of treating hydrocarbon vapors in the presence of hydrogen or a hydrogen-rich gas at typical temperatures of 850° to 1,000 °F. and pressures of 50 to 1,000 p.s.i.g. with catalysts such as the oxides or sulfides or metals of Groups IV, V, VI, VII and VIII of the Periodic Table, either alone or preferably supported on suitable relatively large pore size base such as alumina gel, precipitated alumina, zinc alumina, silica alumina, etc. Typical hydroforming catalysts include the oxide Group VI metals such as molybdenum, chromium, the metals of the palladium series such as platinum, palladium etc. deposited on a suitable support such as alumina, silica-alumina, or components thereof. These catalysts may contain varying amounts of halogen, boria, or other components designed to enhance their activity or selectivity. A particularly suitable catalyst of the art comprises platinum (e.g. 0.02 to 2.0 weight percent) on alumina containing a minor amount (e.g. 0.1 to 0.5 weight percent) of a chloride or fluoride.

The hydroformed product stream (hydroformate) from a typical hydroforming operation will usually contain a substantial portion (e.g. 1 to 15 weight percent) of normal paraffinic hydrocarbons having an undesirably low octane rating. As such hydroformate streams represent excellent candidates for upgrading by means of the present invention with the low alkali metal content synthetic zeolite catalyst. This is accomplished by contacting reformed naphtha stream in the presence of gaseous hydrogen which may be either separately added or, more preferably, included in the reformer gas with a catalyst of the type hereinbefore described. The result of such treatment is to selectively convert the normal paraffinic components to lower boiling saturated products which can be readily recovered, thus leaving a naphtha product of greatly enhanced quality. A number of conventional hydroforming stages can be employed prior to the final treatment with the catalyst of the invention. Moreover, the entire hydroformate can be subjected to the small pore size synthetic zeolite catalyst, or a selected portion thereof can be thus treated. Further, a selective fraction of the hydroformate can be separated by, for example, fractionation, said fraction containing a high proportion of the undesirable straight-chain hydrocarbons, and this fraction separately contacted with the small pore size synthetic zeolite catalysts so as to upgrade it, followed by blending back with the remainder of the hydroformate to achieve an overall increase in octane rating without necessity for subjecting the entire hydroformate to the small pore size synthetic zeolite catalyst.

As mentioned, it is additionally contemplated to pretreat a typical hydroformer feed stock, such as a virgin naphtha, prior to its contact with the conventional hydroforming catalysts of the art. The selective conversion of the undesirable straight-chain component in the feed leaves the desirable naphthenic and aromatic portions essentially unchanged. In the hydroforming zones per se, less carbon formation will be encountered. Subsequent to the pretreatment stage, any number of conventional hydroforming stages can be employed. The hydroformate produced may be blended with a high-octane $C_4$ and $C_5$ product from the pretreatment zone separated in a fractionation zone to thereby obtain maximum yield of high octane products. Further, the hydroformate itself can be separated by fractionation with subsequent recovery and blending of the higher octane fractions for particular uses or purposes.

As mentioned, in addition to the posttreatment and pretreatment of hydroformer feed stocks and products as just described, it is further contemplated that the zeolite catalyst can be uniformly admixed with the conventional hydroforming catalysts to achieve the desirable results herein described. These include conversion of normal paraffins to gaseous hydrocarbons simultaneously with the dehydrogenation reactions to produce aromatics. The aromatics so produced are predominantly benzene and toluene because of the dealkylation properties of the erionite in the reformer reactors. Thus, upon comingling the conventional hydroformer catalyst and the small pore size synthetic zeolite catalysts, there results a product predominately comprised of lower boiling aromatics and which is essentially normal paraffin free. These improvements are reflected in a higher octane number naphtha. The products boiling lower than the desired naphtha range, e.g. $C_4$, are removed by distillation.

Finally, as also mentioned, it is further contemplated that the tail reactor of a conventional hydroforming operation will contain synthetic zeolite catalyst in the last increment of reactor space, as distinguished from an entirely separate reactor.

DESCRIPTION OF THE PREFERRED EMBODIMENTS

Example 1

This example illustrates the preparation and use of the catalysts of the invention, comprising small pore size synthetic crystalline alumino-silicate zeolites combined with metallic hydrogenation components. The zeolite catalyst utilized in this example was used for the selective hydrocracking of a $C_5$–$C_6$ naphtha fraction derived from an Arabian crude. The naphtha feed has a gravity of 85.4° API and a boiling range of about 150° to 193° F. (98 percent overhead). The naphtha feed had the following composition:

|  | Product wt. % Distribution. |
|---|---|
| $C_4$ and lighter | 1.8 |
| iso-pentane | 14.1 |
| normal-pentane | 24.2 |
| iso-hexane | 30.9 |
| normal-hexane | 22.9 |
| benzene and methyl cyclopentane | 6.1 |

The superior activity of a synthetic zeolite catalyst as compared to its naturally occurring counterpart is illustrated with this feed, utilizing a palladium hydrogen erionite catalyst, as follows:

HYDROSELECTIVE CRACKING OF ARABIAN $C_5$–$C_6$ NAPHTHA.—SYNTHETIC vs. NATURAL ERIONITE AS CATALYST COMPONENT

[Feed rate=0.5 v./v./hr., 500 p.s.i.g., 1,500–3,000 s.c.f./b. $H_2$ gas rate]

| Palladium hydrogen erionite catalysts: | A | | B | |
|---|---|---|---|---|
| Preparation | | | | |
| Erionite Source | Synthetic | | Natural | |
| Potassium content of catalyst, wt. percent | 3.7 | | 3.7 | |
| Temperature, °F | 750 | 700 | 750 | 700 |
| Analytical data on liq. prod.: | | | | |
| n-$C_5$, wt. percent | 0.9 | 2.0 | 10.2 | 12.7 |
| n-$C_6$, wt. percent | 0.2 | 0.3 | 2.6 | 4.4 |
| Conversion of feed to $C_4$ | 73 | 62 | 42 | 36 |

Thus the synthetic erionite base catalyst shows better conversion at the same temperature, and even at lower temperatures, which is a criterion for catalyst activity.

Example 2

The same phenomenon has been observed with catalysts prepared from zinc exchanged erionites of about the same potassium level. These data are:

HYDROSELECTIVE CRACKING OF ARABIAN $C_5$–$C_6$ NAPHTHA.—SYNTHETIC vs. NATURAL ERIONITE AS CATALYST COMPOUND

[Feed rate=0.5 v./v./hr., 500 p.s.i.g., 1,500–3,000 s.c.f./b. $H_2$ gas rate]

| Palladium zinc erionite catalysts: | C | | D | |
|---|---|---|---|---|
| Preparation | | | | |
| Erionite source | Synthetic | | Natural | |
| Potassium content of catalyst, wt. percent | 2.5 | | 3.2 | |
| Temperature, °F | 850 | 750 | 850 | 750 |
| Analytical data on liq. prod.: | | | | |
| n-$C_5$, wt. percent | 0.1 | 1.2 | 1.7 | 5.4 |
| n-$C_6$, wt. percent | 0.0 | 0.1 | 0.7 | 2.5 |
| Conversion of feed to $C_4$—, wt. percent | 72 | 61 | 62 | 49 |

Example 3

This example illustrates the advantage of the synthetic base for a zinc-palladium catalyst when processing a reformate feed for normal paraffin conversion, and to thus achieve a product having an improved octane rating.

HYDROSELECTIVE CRACKING OF REFORMATE.—SYNTHETIC vs. NATURAL ERIONITE AS CATALYST COMPONENT

[Feed rate=8 v./v./hr., 500 p.s.i.g., 1,000-2,000 s.c.f./b. $H_2$ gas rate]

| Palladium zinc erionite catalysts (presulfided): | C | D |
|---|---|---|
| Preparation | | |
| Erionite source | Synthetic | Natural |
| Temperature | 775° F. | . |
| Analytical data on liquid product: | | |
| n-Paraffins, wt. percent [1] | 0.15 | 1.55 |
| Percent removal | 97 | 67 |
| Octanes: | | |
| RON clear [2] | 101.9 | 101.5 |
| MON clear [3] | 90.8 | 90.4 |

[1] Feed: 4.74.  [2] Feed: 99.5  [3] Feed: 88.0.

The synthetic erionite base catalyst shows 10 fold better normal paraffin removal at equivalent process conditions and thus a higher research and motor octane value for the liquid product.

Example 4

This example illustrates the effectiveness of a synthetic erionite base zinc-palladium catalyst (sulfided) for hydrodealkylation of $C_8$ to $C_{10}$ aromatics to benzene and toluene.

HYDROSELECTIVE CRACKING OF HEAVIER AROMATICS IN REFORMATE

[Feed rate=0.5 v./v./hr., 500 p.s.i.g., 2,000 s.c.f./$H_2$ gas rate, 950° F.]

| Palladium-zinc erionite catalyst (sulfided) (preparation C) | Feed | Product |
|---|---|---|
| Composition, wt. percent: | | |
| Benzene | 1.2 | 5.7 |
| Toluene | 17.4 | 26.0 |
| Ethyl benzene | 12.8 | 2.4 |
| Octane data: | | |
| RON clear | 99 | 104.6 |
| MON clear | 87.5 | 95.3 |

Benzene yield is increased 4.7 fold and toluene increased 1.5 fold even though the reformate was essentially free of naphthenes. The octane improvement may be attributed to normal paraffin conversion to gaseous products and the dealkylation of ethyl benzene and other higher aromatics to benzene and toluene.

Example 5

This example illustrated the utility of Palladium Hydrogen Erionite (synthetic) for improving the octane sensitivity of olefinic catalytic naphtha (hydrotreated).

HYDROSELECTIVE CRACKING OF LIGHT CATALYTIC NAPHTHA.—SYNTHETIC ERIONITE AS CATALYST COMPONENT

[Feed rate=1 v./v./hr., 500 p.s.i.g., 2,000 s.c.f. $H_2$/b. gas rate, 800° F.] Hydrogen palladium erionite catalyst (preparation A)

| | | Hydrotreating-hyroselective cracking | |
|---|---|---|---|
| Stabilized naphtha inspections | Feed | 1st stage hydrofined product | 2nd stage hydroselective cracked product |
| Gravity, °API | 63.3 | 70.5 | 67.3 |
| Bromine number | 72 | Nil | |
| Sulfur, p.p.m. | 330 | 47 | |
| Octane data: | | | |
| ROM plus 3 cc. TEL | 99 | 95.3 | 99.7 |
| MON plus 3 cc. TEL | 86 | 91.3 | 93.6 |
| Octane sensitivity | 13 | 4 | 6 |

Superior octane product of less sensitivity is obtained by hydroselective cracking of a light catalytic naphtha.

Example 6

An added advantage of the synthetic zeolite is that control of synthesis conditions will lead to constant performance. This is not to be expected with the naturally occurring zeolites where variations in conditions of formation, secondary exchanges and dilution with extraneous material lead to variation in performance. Variable performance when synthesis conditions are out of control is illustrated with catalysts from the naturally occurring erionites as follows:

HYDROSELECTIVE CRACKING OF ARABIAN $C_5$-$C_6$ NAPHTHA.—0.5% Pd Zn CATALYSTS FROM NATURALLY OCCURRING ERIONITES

[0.5 v./v./hr. at 500 p.s.i.g., 1,500-3,000 s.c.f./b. $H_2$ gas rate]

| Preparation | E | | F | | D | |
|---|---|---|---|---|---|---|
| Erionite Source | Pine Valley, Nevada | | Rome, Oregon | | Not identified | |
| Temperature, °F | 800 | 750 | 850 | 750 | 850 | 750 |
| Analytical date on liq. prod.: | | | | | | |
| Wt. percent n-$C_5$ | 1.9 | 4.7 | 10.7 | 14.2 | 1.7 | 5.4 |
| Wt. percent n-$C_6$ | 0.1 | 0.4 | 5.3 | 14.1 | 0.7 | 2.5 |
| Conversion of feed to $C_4$ | 63.2 | 56.7 | 41.8 | 20.9 | 62.3 | 49.2 |

From the conversion-temperature relationship, preparation E is somewhat more active than preparation D and either of the two is markedly superior to preparation F. Such variations would not be expected in a synthetic base with reaction conditions under control and where extraneous impurities are maintained at a minimum.

What is claimed is:

1. An improved process for selectively removing straight-chain hydrocarbons from a hydrocarbon feed which comprises selectively hydrocracking said feed by contact, at elevated temperature and pressure and in the presence of hydrogen, with a catalyst comprising a synthetic crystalline aluminosilicate zeolite having the structure of erionite, said zeolite further having a relatively small pore size, an alkali metal content of less than about 3.5 weight percent, and being combined with a metallic hydrogenation component.

2. The process of claim 1, wherein said metal in said metallic hydrogenation component comprises a metal selected from the group consisting of metals in Groups V-B, VI-B, VII-B and VIII of the Periodic TAble.

3. The process of claim 1, wherein said hydrogenation component comprises a platinum group metal.

4. The process of claim 1 wherein said zeolite has been cation-exchanged at a temperature within the range of about 150° to 300° F.

5. The process of claim 1, wherein said zeolite has been base exchanged with hydrogen-containing cations.

6. The process of claim 1, wherein said zeolite has been cation-exchanged with both hydrogen-containing cations and metal cations.

7. The process of claim 1, wherein said zeolite has been cation-exchanged with Group II-B metal cations.

8. The process of claim 1, wherein the alkali metal content of said zeolite is less than about 2.6 weight percent.

9. The process of claim 1, wherein the alkali metal content of said zeolite is less than about 1.5 weight percent.

10. The process of claim 1, wherein said hydrocarbon feed is predominantly naphtha containing.

11. The process of claim 1, wherein said feed comprises a hydroformed naphtha product stream.

12. The process of claim 1, wherein said feed is a previously hydrocracked stream.

13. The catalyst composition comprising a metallic hydrogenation component combined with a relatively small pore size synthetic crystalline alumino-silicate zeolite, said zeolite having an alkali metal content lower than that attainable by cation exchange at relatively low temperature.

14. The composition of claim 13, wherein the alkali metal is less than about 4 weight percent.

15. The composition of claim 13, wherein the alkali metal content is less than about 2.6 weight percent.

16. The composition of claim 13, wherein the alkali metal content is less than about 1.5 weight percent.

Disclaimer 3,625,880.—*Glen P. Hamner*, Baton Rouge and *Ralph B. Mason*, Denham Springs, La. CATALYSTS FOR THE SELECTIVE CONVERSION OF STRAIGHT-CHAIN HYDROCARBONS. Patent dated Dec. 7, 1971. Disclaimer filed June 11, 1971, by the inventors; the assignee, *Esso Research and Engineering Company*, assenting.

Hereby disclaims the portion of the term of the patent subsequent to Apr. 20, 1988.

[*Official Gazette September 19, 1972.*]